United States Patent [19]
Shi et al.

[11] Patent Number: 5,025,997
[45] Date of Patent: Jun. 25, 1991

[54] MULTI-PHASE SYNCHRONOUS AUTOMATIC WINDING METHOD AND APPARATUS FOR MOTOR STATORS

[75] Inventors: Kwo-Xyan Shi; Fuh-Chyun Tang, both of Hsin, Taiwan

[73] Assignee: Industrial Technology Research Institute, Hsin-chu, Taiwan

[21] Appl. No.: 444,936

[22] Filed: Dec. 4, 1989

[51] Int. Cl.⁵ .......................................... H02K 15/085
[52] U.S. Cl. .................. 242/1.10 R; 29/596; 242/7.030
[58] Field of Search ............. 242/1.1 E, 1.1 R, 7.02, 242/7.03, 7.05 C, 7.11, 7.14, 7.15, 205 B; 29/569

[56] References Cited

U.S. PATENT DOCUMENTS

| | | | |
|---|---|---|---|
| 2,647,696 | 8/1953 | Brunard | 242/1.1 R |
| 3,822,830 | 7/1974 | Peters | 242/1.1 R |
| 4,588,143 | 5/1986 | Hefzel | 242/1.1 R |

*Primary Examiner*—Daniel P. Stodola
*Assistant Examiner*—William G. Battista, Jr.
*Attorney, Agent, or Firm*—Cushman, Darby & Cushman

[57] ABSTRACT

Disclosed is a motor stator winding method and apparatus particularly suitable for multi-phase synchronous automatic winding of a multi-phase motor stator. The motor stator, after being held with a stator fixture, may be accurately rotated through a predetermined angle as required with a rotating device such as a timing belt and a pulley. Each of the multi-phase wires may be carried to two extremities externally of the two longitudinal ends of the motor stator with a wire carrying apparatus, capable of periodically moving through the central hole of the motor stator, and then caught with a wire feeding apparatus disposed externally of each longitudinal end of the motor stator and properly fed into the wire slots of the motor stator so as to perform a synchronous automatic winding operation for a multi-phase motor stator. Prior to the winding operation, a wire stopper is attached to each end of the motor stator so as to stop the wires, which have been wound into the wire slots, from inward sliding under the tension of the wires. The present invention is particularly suitable for the winding operation of motor stators having narrower wire slots and longer lengths such as a brushless servo motor stator.

11 Claims, 8 Drawing Sheets

MULTI-PHASE SYNCHRONOUS AUTOMATIC WINDING METHOD AND APPARATUS FOR MOTOR STATORS

BACKGROUND OF THE INVENTION

The present invention relates to a multi-phase synchronous automatic winding method and apparatus for motor stators.

Conventional winding methods for motor stators may generally be divided into two categories—semiautomatic winding method in which wires are wound into windings prior to being put into the wire slots of a motor stator, and full-automatic winding method in which wires are directly wound into the wire slots of the motor stator. The former method suffers from two drawbacks: the winding operation of the wire is not fully-automated: and putting the windings into the wire slots of the motor stator can be difficult when the width of the wire slots is smaller than 2 mm. The latter method adopts a wire carrying means moving repeatedly through the wire slots of the motor stator to bring and wind the wires into the wire slots and thus is suitable only for the winding operation of a motor stator having a few wire slots which are wide: enough for allowing the wire carrying means to pass therethrough. Besides, as can be seen from FIG. 1, since the slot pitch $d_2$ between two adjacent wire slots of the same pole of a motor stator when measured at the bottom of the slots is larger the slot pitch $d_1$ of the same wire slots when measured at the openings of the slots, those wires having been wound into the wire slots are apt to slide inward towards the openings of the slots under the action of the tension of the wires, which inevitably hinders subsequent winding operation. This constitutes another disadvantage of the latter winding method.

SUMMARY OF THE INVENTION

In view of the above-described drawbacks of prior art, the primary object of the present invention is to provide an improved multi-phase synchronous automatic winding technique for motor stators which is suitable for the winding operation of motor stators having narrow wire slots and which can completely avoid the disadvantage of inward sliding of the wires which have been wound in the wire slots.

In accordance with the first aspect of the present invention, a multi-phase motor stator synchronous automatic winding method adapted to wind enamel wires into a multi-phase motor stator having a central hole, a first longitudinal end, a second longitudinal end, and a plurality of wire slots which are formed into the surface of the central hole and extend between the two longitudinal ends for receiving the wires therein, is provided. This method comprises:

(1) attaching a first wire stopper and a second wire stopper, respectively, to the first longitudinal end and the second longitudinal end of the motor stator;

(2) holding the motor stator with a stator fixture which may be operated to precisely rotate the motor stator through a predetermined angle as required;

(3) covering the first end and the second end of the motor stator, respectively, with a first wire guiding member and a second wire guiding member, each of the wire guiding members including a plurality of circumferentially equally-spaced guiding slits which commence from outward of a longitudinal end of the motor stator, extend longitudinally along the inner surface of the central hole of the motor stator, and radially align, respectively, with the center of one of the wire slots for accurately guiding the wires into the wire slots;

(4) mounting a plurality of wires, the same in number as the number of phases of the motor stator, into a wire carrying means capable of moving periodically through the central hole of the motor stator for carrying the wires to two extremities externally of the two ends of the motor stator, and fixing the end portion of each wire to said stator fixture:

(5) carrying the plurality of wires to the extremity externally of the first longitudinal end of the motor stator with the wire carrying means;

(6) catching and pulling each of the wires with one of a plurality of first wire feeding means and feeding each wire into a first wire slot of the motor stator under the guidance of the guiding slits of the first wire guiding member;

(7) rotating the motor stator relative to the wire guiding members through a predetermined angle so as to move a second wire slot of the motor stator, which is of the same pole as the first wire slot of the motor stator, into the original location of the first wire slot, whereby winding a length of each wire onto the first wire stopper covering an angular range of said predetermined angle and stopping the wound wires from moving inward by the first wire stopper;

(8) carrying each wire outward of the second longitudinal end of the motor stator with the wire carrying means and releasing the wires caught by the first wire feeding means at a proper position during the movement of the wire carrying means toward the second end of the motor stator;

(9) catching and pulling each wire with one of a plurality of second wire feeding means and feeding the wire into the second wire slot of the motor stator under the guidance of the guiding slits of the second wire guiding member;

(10) rotating the motor stator, in a direction opposite to the rotation direction of the motor stator in step (7), through said predetermined angle so as to move the motor stator back to the original location thereof in step (6) whereby winding a length of each wire onto said second wire stopper covering the angular range of said predetermined angle and stopping the wound wires from moving inward with the second wire stopper;

(11) carrying each of the wires to said extremity externally of the first end of the motor stator with the wire carrying means and releasing the wires caught by the second wire feeding means at a proper position during the movement of the wire carrying means toward the first end of the motor stator;

(12) repeating the above steps (6) through (11) until each wire has been wound in the first and second wire slots for predetermined turns so as to complete the winding operation of the first pole of the motor stator;

(13) rotating the motor stator to a position suitable for the winding operation of the next pole of the motor stator, and performing the winding operation according to steps (6) through (12); and

(14) repeating step (13) until all of the poles of the motor stator have been finished by the winding operation.

In accordance with the second aspect of the present invention, a multi-phase motor stator synchronous automatic winding apparatus adapted for winding enamel wires into a multi-phase motor stator having a central hole, a first longitudinal end, a second longitudinal end, and a plurality of wire slots which are formed into the surface of the central hole and extend between the two ends for receiving the wires therein, is provided. This apparatus comprises:

A first wire stopper and a second wire stopper respectively attached to the first end and the second end of the motor stator so as to stop the wires which have been wound into the wire slots of the motor stator from sliding radially inward under the action of the tension of the wires;

a stator fixture for holding the motor stator having the first wire stopper and the second wire stopper attached to its two ends;

a first wire guiding member and a second wire guiding member which cover, respectively, the first end and the second end of the motor stator, and which extend longitudinally into the central hole of the motor stator, each of the wire guiding members including a plurality of circumferentially equally-spaced guiding slits which commences from on outward of an end of the motor stator and extends longitudinally along the inner surface of the central hole of the motor stator, and radially aligns, respectively, with the center of one of the wire slots for accurately guiding the wires into the wire slots;

rotating means adapted to accurately rotate the stator fixture together with the motor stator, relative to the wire guiding members, through a predetermined angle as required;

wire carrying means capable of moving periodically through the central hole of the motor stator for carrying the wires to two extremities externally of the two ends of the motor stator;

a plurality of pairs of first wire feeding means and second wire feeding means, with the number of pairs being the same as the phase number of the motor stator, the first wire feeding means being disposed externally of the first longitudinal end of the motor stator in a circumferentially equally spaced manner, and the second wire feeding means being disposed externally of the second longitudinally end of the motor stator in a circumferentially equally spaced manner; each of the first wire feeding means being adapted to catch and pull a wire and feed the wire into a wire slot of the motor stator under the guidance of the guiding slits of the first wire guiding member, and each of the second wire feeding means being adapted to catch and pull a wire and feed the wire into another wire slot of the motor stator under the guidance of the guiding slits of the second wire guiding member; and a plurality of tension control means each of which being adapted to properly control the tension of a wire to be wound in the motor stator.

BRIEF DESCRIPTION OF THE DRAWINGS

The present invention can be more fully understood by reference to the following description and accompanying drawings, which form an integral part of this application.

DETAILED DESCRIPTION OF THE PREFERRED EMBODIMENTS

The present invention will now be described in more detail with reference to the above drawings.

Figure 1:
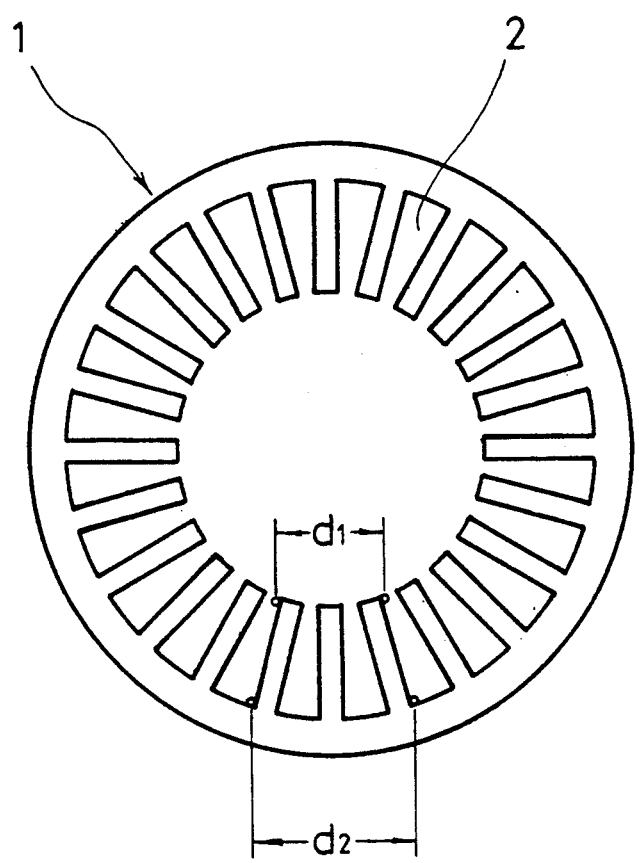
FIG. 1 is an end view of a motor stator.
Figure 2:
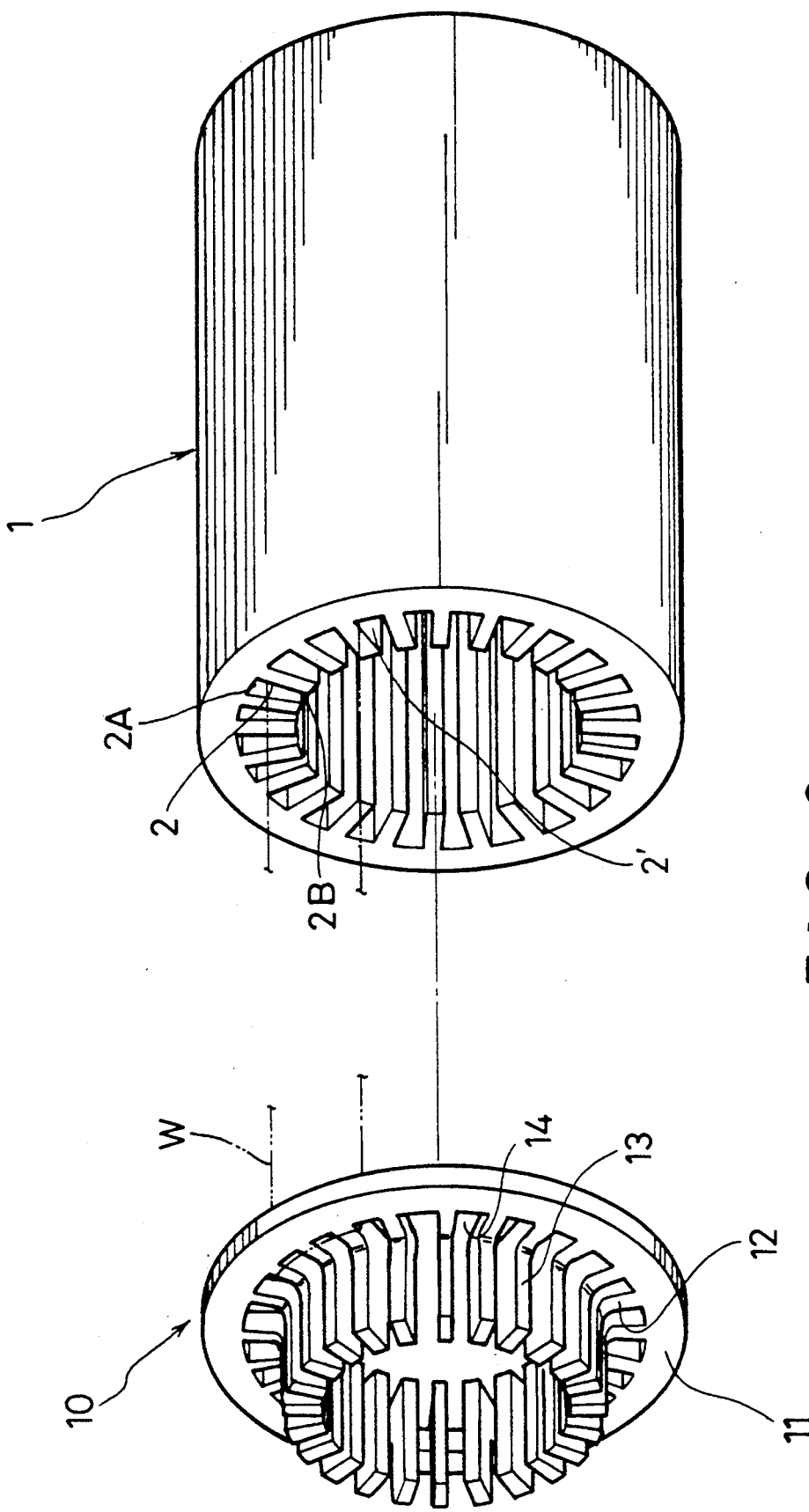
FIG. 2 is a perspective view of a motor stator and a wire stopper to be attached to one end of the motor stator.

FIG. 2 shows the construction of a motor stator 1 and a wire stopper 10 to be attached to one end of the motor stator 1 (another wire stopper to be attached to another end of the motor stator is now shown in the figure). The motor stator 1 is substantially a hollow cylinder with a plurality of circumferentially equally spaced wire slots 2, 2'—being formed into the inner surface of its central hole for receiving enamel wires W therein. The wire stopper 10 includes an annular portion 11 and a plurality of ribs 12 of which the number is the same as the number of the wire slots of the motor stator 1. Each rib 12 extends radially inward from the inner edge of the annular portion 11 and is circumferentially equally spaced from adjacent ribs. Thus each space 14 between two adjacent ribs 12 of the wire stopper 10 axially aligns a wire slot of the motor stator 1 when the wire stopper 10 is attached to the end of the motor stator 1. Each rib 12 comprises, at its inner free end, a stopping portion 13 which extend substantially perpendicularly to the plane of the annular portion 11 of the wire stopper 10. During the winding operation, the end portion of an enamel wire W (shown in FIG. 2 by dotted lines) is first fed into a wire slot 2 of the motor stator 1 and brought to the first end of the motor stator 1 (namely the left end of the motor stator 1 in FIG. 2). Next, the wire W is wound around the outer circumference of the stopping portions 13 of several consecutive ribs 12 of the wire stopper 10 attached to the first (left) end of the motor stator 1, and then fed through a space 14 of the wire stopper 10 into another wire slot 2', which is of the same pole as the wire slot 2, and brought to the second (right) end of the motor stator 1. Subsequently, the wire W is again wound around a wire stopper (now shown) attached to the second end of the motor stator 1 in a similar manner and brought back to the wire slot 2, thereby finishing one turn of the winding. Due to existence of the stopping portions 13, the radially inward sliding of the wires from the bottom portion 2A toward the opening portion 2B of the wire slot may be completely stopped.

The winding apparatus in accordance with an embodiment of the present invention, which can be applied to the three-phase synchronous automatic winding operation of a three-phase motor stator, will now be described by referring to FIGS. 3 through 8.

As shown in FIGS. 3 to 6, in addition to the aforementioned wire stoppers 10 attached to the two ends of the motor stator 1, the winding apparatus of the present invention mainly comprises a stationary frame 5, a movable frame 6, two wire guiding members 30 and 30', rotating means 40, three first wire feeding means 50 and three second wire feeding means 50', a wire carrying means 70, and three sets of tension control means 80 and wire breakage stop means 90. The stationary frame 5 is fixed to a working table T. While the movable frame 6 can be moved, relative to the stationary frame 5, by an air cylinder 9 so that the stationary frame 5 and the movable frame 6 may optionally become a closed state (see FIG. 4) or an open state (not shown). The wire guiding member 30 and the three first wire feeding means 50 are mounted on the movable frame 6, while the wire guiding member 30', the three second wire feeding means 50', the stator fixture 30 and the rotating means 40 are mounted on the stationary frame 5.

Figure 5:
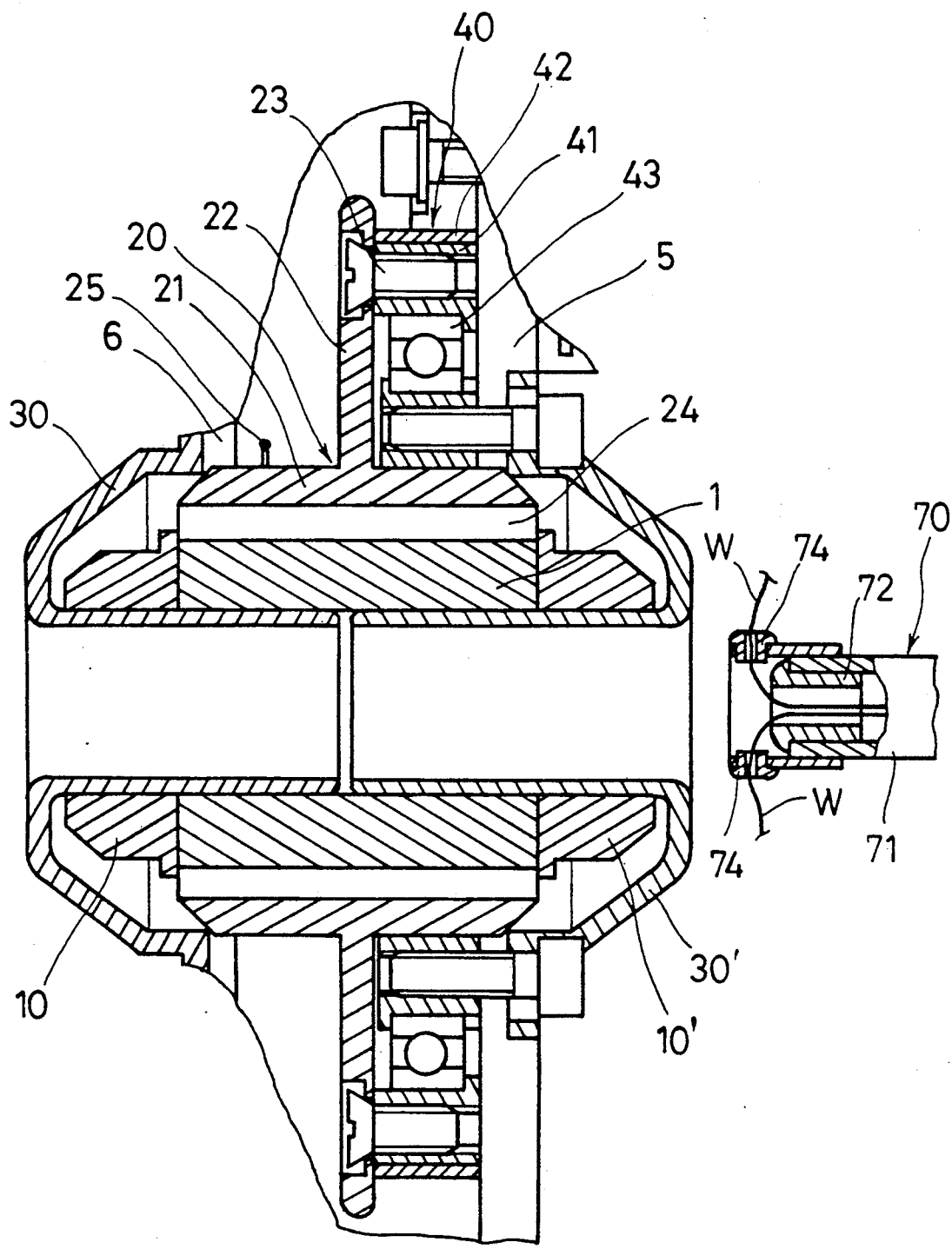
FIG. 5 is a further enlarged fragmentary view showing the portion in the vicinity of the motor stator in FIG. 4.

Referring now particularly to FIG. 5, the rotating means 40 comprises a pulley 41 rotatably mounted, through a bearing 43, to the stationary frame 5, and a timing belt 42 adapted to accurately drive the pulley 41 to rotate through an angle as required.

As can be best seen in FIG. 5, the stator fixture 20 generally comprises a cylindrical portion 21 and a flange 22 extending radially outward from the outer periphery of the cylindrical portion 21. The stator fixture 20 is fastened, at its flange 22, to the pulley 41 by a plurality of set screws 23. The motor stator 1 is held within the cylindrical portion 21 of the stator fixture 20 by means of a key 24, whereby the motor stator 1 may be rotated through a required angle together with the stator fixture 20 by driving the pulley 41 with the timing belt 42.

The construction of the wire guiding member 30 or 30' will now be described with reference to FIGS. 4 through 7. Each wire guiding member 30 (30') comprises a cylindrical portion 31 and a flange 32 having a substantially hollow frustoconical shape. The flange 32 of each wire guiding member is fixed to the stationary frame 5 or the movable frame 6 and covers the wire stopper 10 attached to the end of the motor stator 1. The cylindrical portion 31 of each wire guiding member axially extends into the central hole of the motor stator 1. In the flange 32 of each wire guiding member 30 or 30' is formed with three circumferentially equally spaced slits 33 (FIG. 6), each of which also extends, in the direction of the axis of the motor stator 1, into and through the whole length of the cylindrical portion 31 (see FIG. 7). Each slit 33 is of smaller width than the wire slot of the motor stator 1, and always radially aligned with the center of a wire slot during the winding operation. Besides, the edges of each slit 33 are slightly beveled or rounded so as to smoothly guide the wires into the wire slots and to avoid any possible scraping of the wires by the edges of the slits 33.

Figure 3:
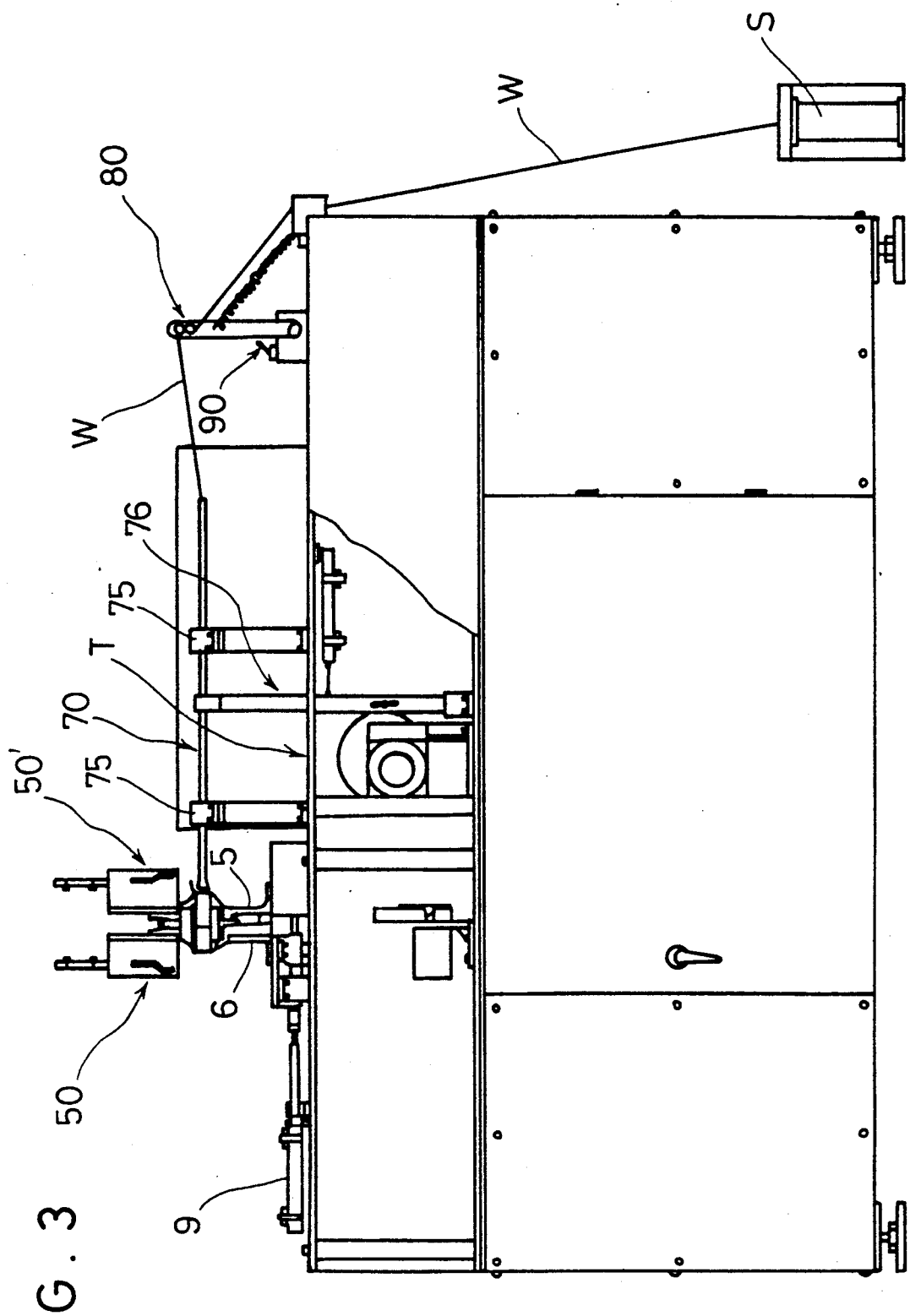
FIG. 3 is an overall front view of the winding apparatus in accordance with an embodiment of the present invention.
Figure 4:
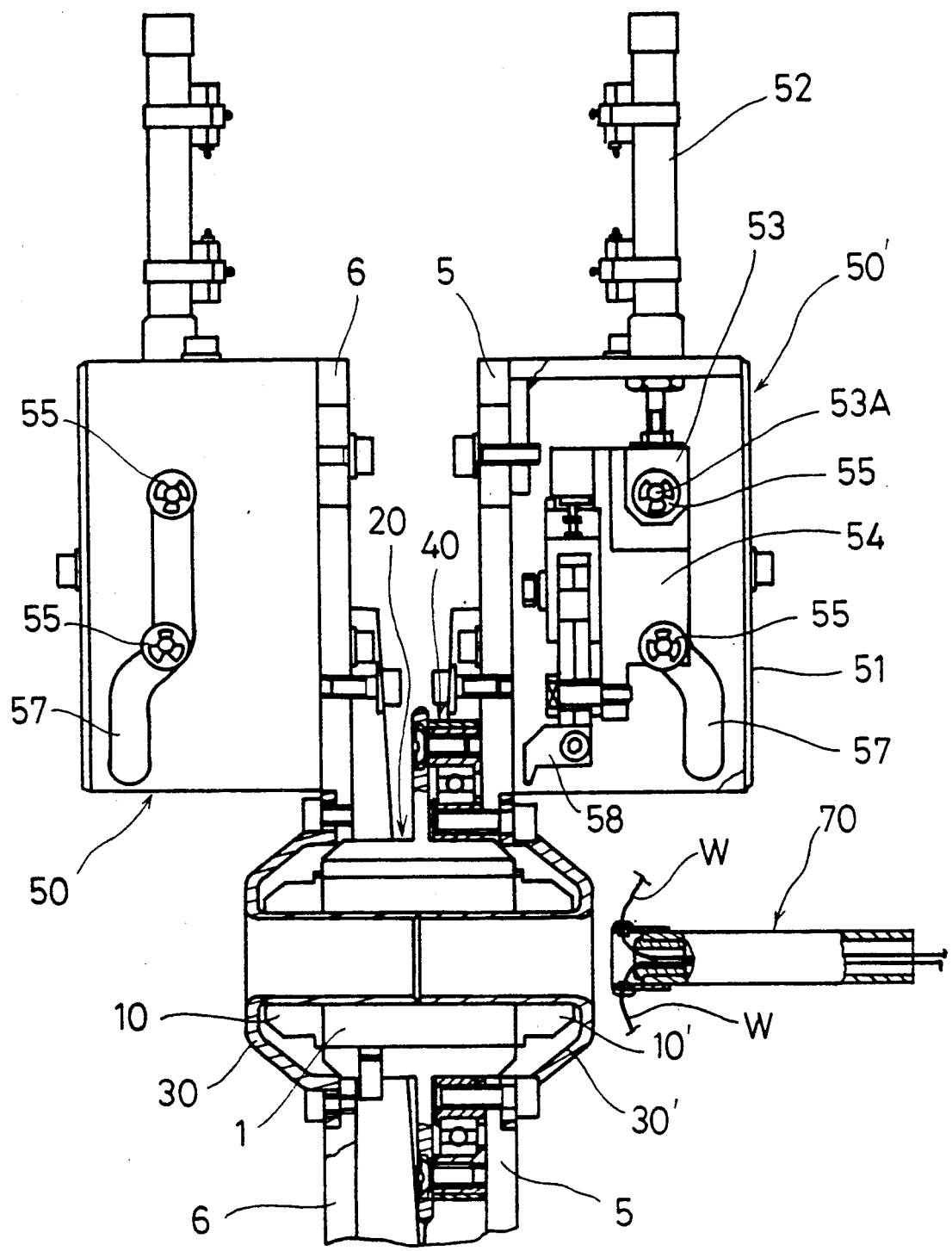
FIG. 4 is an enlarged fragmentary view showing the main portion of the apparatus of FIG. 3.

Referring now to FIGS. 4 and 5, the wire carrying means 70 is adapted to carry the enamel wires W to the two ends of the motor stator 1 for performing the winding operation. The wire carrying means 70 mainly comprises a wire carrying tube 71, two large smooth ceramic rings 72, 73 centrally disposed in the vicinity of the two ends of the tube 71, and three smaller smooth ceramic rings 74 mounted in the tube wall at the end of the tube 71 near the motor stator 1. Each of the three enamel wires W to be wound synchronously in the wire slots of the motor stator 1 is pulled out, respectively, from a wire spool S, through a tension control means 80 (see FIG. 3) and through the ceramic ring 73 (not shown) into the tube 71, against through another ceramic ring 72, and finally drawn out from a small ceramic ring 74 for performing a three-phase synchronous automatic winding operation. A shown in FIG. 3, the wire carrying tube 71 is slidably supported by a pair of bearings 75 mounted on the working table T and is driven by a driving mechanism 76 so that the end portion of the tube 71 near the motor stator 1 maybe moved periodically while intermittently through the central hole of the motor stator 1 between two extremities externally of the free ends of the two wire stoppers 1 attached to the ends of the motor stator 1 so as to carry the wires W to said two extremities for winding operation.

Figure 6:
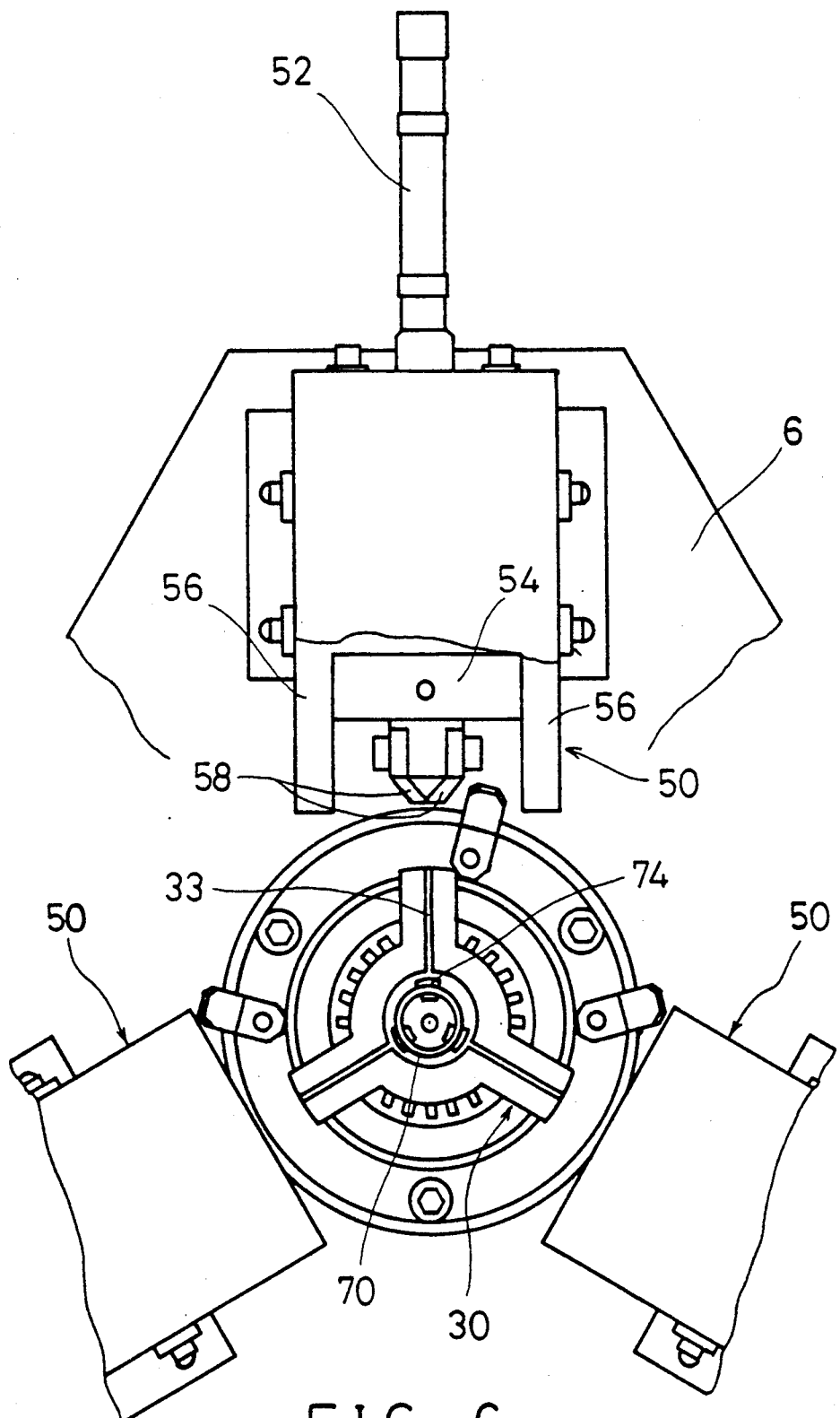
FIG. 6 is a left side fragmentary view of FIG. 4.
Figure 7:
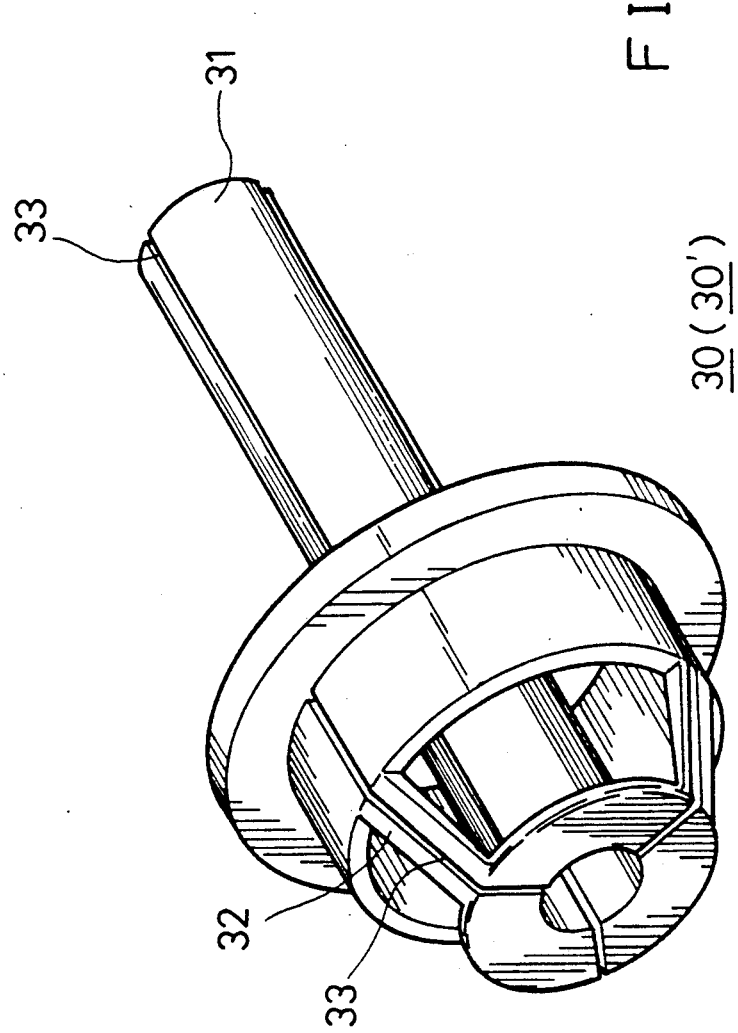
FIG. 7 is an enlarged perspective view of a wire guiding member shown in FIGS. 4 through 6.

The construction of the wire feeding means 50 to 50' and the way of installing the same will now be described by referring to FIGS. 3, 4 and 6. As best shown in FIG. 6, the three first wire feeding means 50 are mounted on the movable frame 6 in a circumferentially equally spaced manner. Similarly, the three second wire feeding means are mounted on the stationary frame 5 in the same manner. Referring to FIG. 4, each wire feeding means 50 (or 50') comprises a housing 51, an air cylinder 52 secured to the housing 51, a ram 53 driven by the air cylinder 52, a catch pawl holder 54 pivotably connected to a pivot center 53A on the ram 53, and a pair of catch pawls 58 (See also FIG. 6) which are supported by the catch pawl holder 54 and are capable of closing or opening relative to each other under the action of an air cylinder (not shown) for clamping or releasing the wires to be wound. On the two sides of the catch pawl holder 54 are provided with two rotatable guide rollers 55, each of which is guided within a guide groove 57 properly provided in the side wall of the housing 51, whereby the catch pawl holder 54 may be rotated around the pivot center 53A, through the cooperation of the guide rollers 55 and the guide groove 57, during the movement of the ram 53 toward the axis line of the motor stator 1 so as to bring the pair of catch pawls 58 into a proper angular status for catching the wires to be wound.

Figure 8:
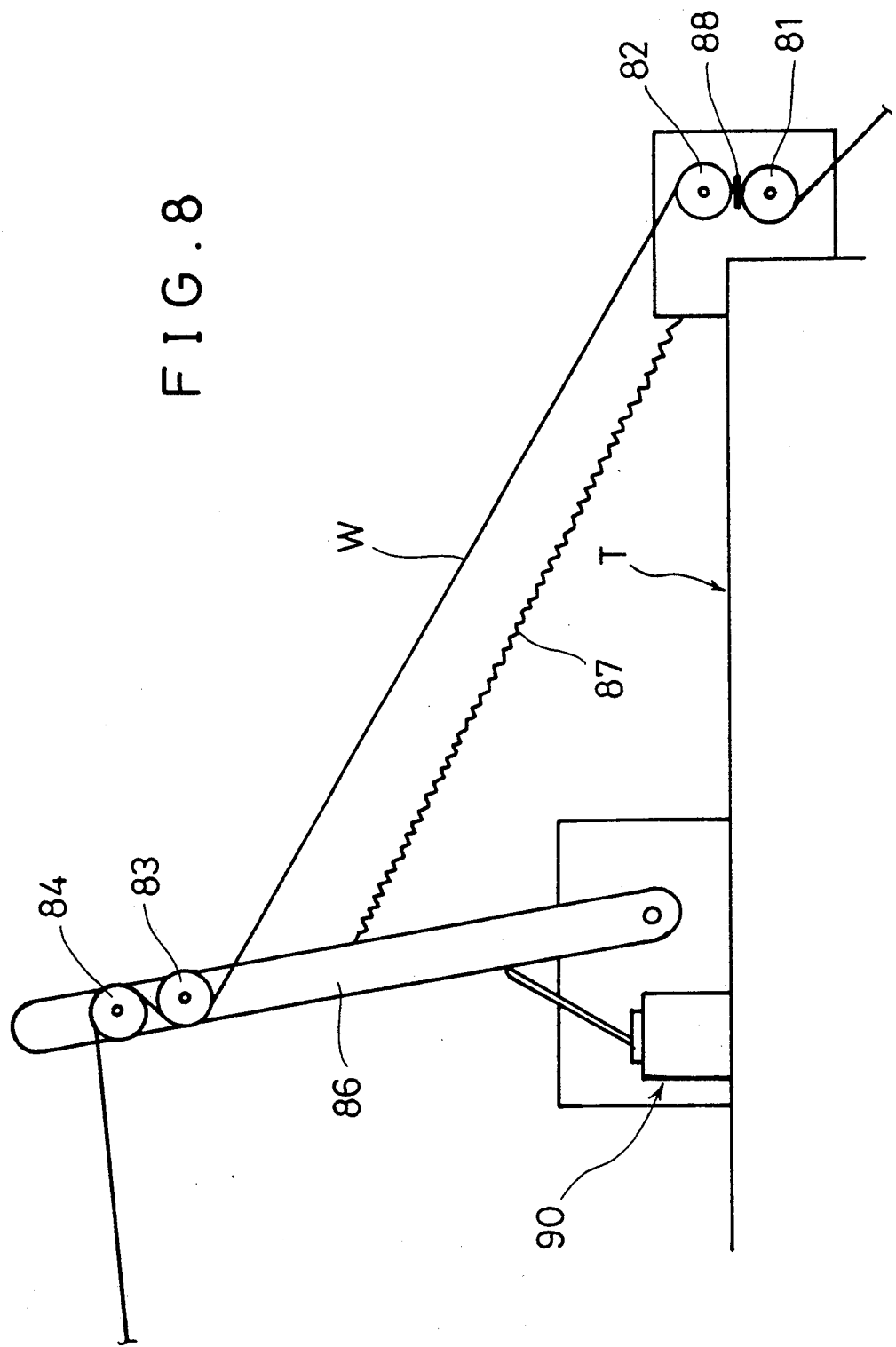
FIG. 8 is an enlarged view of the tension control means shown in FIG. 3.

The construction and the operation of the tension control means 80 and the wire breakage stop means 90 mentioned above will now be described in more detail with reference to FIG. 8. Each tension control means 80 comprises two guiding rollers 81 and 82 rotatably secured to the working table T; an oscillating arm 86 pivotably mounted on the working table T; two guiding rollers 83 and 84 pivotably secured to the oscillating arm 86; a tension spring 87 of which the two ends are respectively fixed to the oscillating arm 86 and the working table T. The enamel wire W is guided to pass through the guiding rollers 81, 82, 83 and 84, and also through some cleaning means 88 for cleaning purpose. Beside each tension control means 80 is provided a wire breakage stop means 90 mainly comprising a microswitch adapted to detect the occurrence of possible wire breakage during the winding operation. Under normal operating condition, namely, when no wire breakage occurs, the wire carrying tube 71 moves periodically through the central hole of the motor stator 1, thus driving the oscillating arm 86 to regularly oscillate by the same period, which is detected by the microswitch of the wire breakage stop means 90. However, once wire breakage occurs, the microswitch will automatically break the power supply of the winding apparatus after failing to detect the motion of the oscillating arm 86 over a predetermined time period.

The multi-phase motor stator automatic winding method in accordance with the present invention will now be described by using a three-phase motor stator synchronous automatic winding operation as an example and referring to the accompanying drawings and the above description with respect to the concerned apparatus. This winding method comprises:

(1) attaching the first wire stopper 10 and the second wire stopper 10', respectively, to the left end and the right end of the motor stator 1 (see FIGS. 2, 4 and 5);

(2) holding the motor stator 1 with the stator fixture 20 which may be operated to precisely rotate the motor stator 1 through a predetermined angle as required;

(3) covering the left end and the right end of the motor stator, respectively, with the first wire guiding member 30 and the second wire guiding member 30', each of the wire guiding members 30 (30') including a plurality of circumferentially equally-spaced guiding slits 33 which commence from outward of a longitudinal end of the motor stator 1, extend longitudinally along the inner surface of the central hole of the motor stator 1, and radially aligns, respectively, with the center of one of the wire slots 2 or 2' (FIG. 2) for accurately guiding the wires into the wire slots (see FIGS. 4 to 7);

(4) mounting three wires W into the wire carrying means 70 capable of moving periodically through the central hole of the motor stator 1 for carrying the wires W to two extremities externally of the two ends of the motor stator 1, and fixing the end portion of each wire W to a protrusion 25 formed on the outer periphery of the stator fixture 20 (see FIG. 5);

(5) carrying the three wires W to the extremity externally of the left end of the motor stator 1 with the wire carrying means 70;

(6) catching and pulling, in a synchronous and centrally symmetrical manner, the three wires W with the three first wire feeding means 50 and feeding each wire W into a first wire slot 2 of the motor stator 1 under the guidance of the guiding slits 33 of the first wire guiding member 30 (see FIGS. 4, 5, 6 and 2);

(7) rotating the motor stator 1 relative to the wire guiding members 30 (30') through a predetermined angle with the rotating means 40 so as to move a second wire slot 2' of the motor stator 1, which is of the same pole as the first wire slot 2 of the motor stator 1, into the original location of the first wire slot 2, whereby winding a length of each wire W onto the first wire stopper 10 covering an angular range of said predetermined angle and stopping the wound wires W from moving inward with the first wire stopper 10;

(8) carrying each wire W to the extremity externally of the right end of the motor stator 1 with the wire carrying means 70 and releasing the wires W caught by the first wire feeding means 50 at a proper position during the movement of the wire carrying means 70 toward the right end of the motor stator 1;

(9) catching and pulling, in a synchronous and centrally symmetrical manner, the three wires W with the three second wire feeding means 50' and feeding each wire W into the second wire slot 2' of the motor stator 1 under the guidance of the guiding slits 33 of said second wire guiding member 30';

(10) rotating the motor stator 1, in a direction opposite to the rotation direction of motor stator 1 in the above step (7), through said predetermined angle so as to move the motor stator 1 back to the original location thereof in the above step (6) whereby winding a length of each wire W onto the second wire stopper 10' covering an angular range of said predetermined angle and stopping the wound wires W from moving inward with the second wire stopper 10';

(11) carrying each of the wires W to the extremity externally of the left end of the motor stator 1 with the wire carrying means 70 and releasing the wires W caught by the second wire feeding means 50' at a proper position during the movement of the wire carrying means 70 toward the left end of the motor stator 1;

(12) repeating steps (6) through (11) until each wire W has been wound in the first and second wire slots 2, 2' for predetermined turns so as to complete the winding operation of the first pole of the motor stator 1;

(13) rotating the motor stator 1 to a position suitable for the winding operation of the next pole of the motor stator 1, and performing the winding operation according to the above steps (6) through (12); and

(14) repeating the above step (13) until all of the poles of the motor stator 1 have finished winding operation.

While the invention has been described in terms of a preferred embodiment, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A multi-phase motor stator automatic winding method for winding enamel wires into a multi-phase motor stator having a central hole, a first longitudinal end, a second longitudinal end, and a plurality of wire slots which are formed into the surface of the central hole and extend between the two longitudinal ends for receiving the wires therein, said method comprising:

(i) attaching a first wire stopper and a second wire stopper, respectively, to the first longitudinal end and the second longitudinal end of the motor stator;

(ii) holding the motor stator with a stator fixture which may be operated to precisely rotate the motor stator through a predetermined angle as required;

(iii) covering the first end and the second end of the motor stator, respectively, with a first wire guiding member and a second wire guiding member, each of said wire guiding members including a plurality of equally-spaced guiding slits which commence from outward of a longitudinal end of the motor stator, extend longitudinally along the inner surface of the central hole of the motor stator, and radially align, respectively, with the center of one of the wire slots for accurately guiding the wires into the wire slots;

(iv) mounting a plurality of wires, the same in number as the number of phase of the motor stator, into a wire carrying means capable of moving periodically through the central hole of the motor stator for carrying the wires to two extremities externally of the two ends of the motor stator, and fixing the end portion of each wire to said stator fixture;

(v) carrying the plurality of wires to said extremity externally of the first longitudinal end of the motor stator with said wire carrying means;

(vi) catching and pulling each of the wires with one of a plurality of first wire feeding means and feeding each wire into a first wire slot of the motor stator under the guidance of said guiding slits of said first wire guiding member;

(vii) rotating the motor stator relative to said wire guiding members through a predetermined angle so as to move a second wire slot of the motor stator, which is of the same pole as said first wire slot of the motor stator, into the original location of said first wire slot, whereby winding a length of each wire onto said first wire stopper covering an angular range of said predetermined angle and stopping the wound wires from moving inward with said first wire stopper;

(viii) carrying each wire outward of the second end of the motor stator with said wire carrying means and releasing the wires caught by said first wire feeding means at a proper position during the movement of said carrying means toward the second end of the motor stator;

(ix) catching and pulling each wire with one of a plurality of second wire feeding means and feeding the wire into said second wire slot of the motor stator under the guidance of said guiding slits of said second wire guiding member;

(x) rotating the motor stator, in a direction opposite to the rotation direction of the motor stator in said step (vii), through said predetermined angle so as to move the motor stator back to the original location thereof in said step (vi) whereby winding a length of each wire onto said second wire stopper covering an angular range of said predetermined angle and stopping the wound wires from moving inward with said second wire stopper;

(xi) carrying each the wires to said extremity externally of the first end of the motor stator with said wire carrying means and releasing the wires caught by said second wire feeding means at a proper position during the movement of said wire carrying means toward the first end of the motor stator;

(xii) repeating said steps (vi) through (xi) until each wire has been wound in said first and second wire slots for predetermined turns so as to complete the winding operation of the first pole of the motor stator;

(xiii) rotating the motor stator to a position suitable for the winding operation of the next pole of the motor stator, and performing the winding operation according to said steps (vi) through (xii); and (xiv) repeating said step (xiii) until all of the poles of the motor stator have finished winding operation.

2. A motor stator winding method as described in claim 1, wherein all of said first wire feeding means act in a synchronous manner and all of said second wire feeding means act in a synchronous manner so that the winding operation for all phases of the motor stator may be performed in a synchronous manner.

3. A motor stator winding method as described in claim 1, wherein each of said wire feeding means includes a pair of catch pawls capable of closing or opening relative to each other for catching or releasing the wire to be wound; a catch pawl holder for holding the pair of catch pawls; guiding grooves for guiding the movement of said catch pawl holder so as to bring said pair of catch pawls into or away from a position for catching the wire carried by said wire carrying means; an air cylinder for pivotably supporting said catch pawl holder.

4. A motor stator winding method as described in claim 1, wherein said stator fixture is fixed to a pulley driven by a timing belt so that said motor stator may be controlled to accurately rotate through a predetermined angle.

5. A motor stator winding method as described in claim 1, wherein said wire carrying means includes a hollow tube for carrying the wires to be wound by allowing the wires to pass therethrough, and smooth ceramic rings mounted at the two ends of said hollow tube for guiding and avoiding possible scraping of the wires.

6. A multi-phase motor stator automatic winding apparatus for winding enamel wires into a multi-phase motor stator having a central hole, a first longitudinal end, a second longitudinal end, and a plurality of wire slots which are formed into the surface of the central hole and extend between the two longitudinal ends for receiving the wires therein, said apparatus comprising:

a first wire stopper and a second wire stopper respectively attached to the first end and the second end of the motor stator so as to stop the wires which have been wound into the wire slots of the motor stator from sliding radially inward under the action of the tension of the wires;

a stator fixture for holding the motor stator having said first wire stopper and said second wire stopper attached to its two ends;

first wire guiding member and second wire guiding member which cover, respectively, the first end and the second end of the motor stator, and which extend longitudinally into the central hole of the motor stator, with each of said wire guiding members including a plurality of equally-spaced guiding slits, which commence from outward of an end of the motor stator, extend longitudinally along the inner surface of the central hole of the motor stator, and radially align, respectively, with the center of one of the wire slots for accurately guiding the wires into the wire slots;

rotating means adapted to accurately rotate said stator fixture together with the motor stator, relative to said wire guiding members, through a predetermined angle as required;

wire carrying means capable of moving periodically through the central hole of the motor stator for carrying the wires to two extremities externally of the two ends of the motor stator;

a plurality of pairs of first wire feeding means and second wire feeding means, with the number of pairs being the same as the phase number of the motor stator, said plurality of first wire feeding means being disposed externally of the first longitudinal end of the motor stator in a circumferentially equally spaced manner, and said plurality of second wire feeding means being disposed externally of the second longitudinal end of the motor stator in a circumferentially equally spaced manner; each of said first wire feeding means being adapted to catch and pull a wire and feed the wire into a wire slot of the motor stator under the guidance of said guiding slits of said first wire guiding member, and each of said second wire feeding means being adapted to catch and pull a wire and feed the wire into another wire slot of the motor stator under the guidance of said guiding slits of said second wire guiding member; and a plurality of tension control means each of which being adapted to properly control the tension of a wire to be wound in the motor stator.

7. A motor stator winding apparatus as described in claim 6, wherein all of said first wire feeding means act in a synchronous manner and all of said second wire feeding means act in a synchronous manner so that the winding operation for all phases of the motor stator may be performed in a synchronous manner.

8. A motor stator winding apparatus as described in claim 6, wherein each of said wire feeding means includes a pair of catch pawls capable of closing or opening relative to each other for catching or releasing the wire to be wound; a catch pawl holder for holding the pair of catch pawls; guiding grooves for guiding the movement of said catch pawl holder so as to bring said pair of catch pawls into or away from a position for catching the wire carried by said wire carrying means; and an air cylinder for pivotably supporting said catch pawl holder.

9. A motor stator winding apparatus as described in claim 6, wherein said rotating means comprises a pulley to which said stator fixture is fixed, and a timing belt adapted to drive said pulley.

10. A motor stator winding apparatus as described in claim 6, wherein said wire carrying means includes a hollow tube for carrying the wires to be wound by allowing the wires to pass therethrough, and smooth ceramic rings mounted at the two ends of said hollow tube for guiding and avoiding possible scraping of the wires.

11. A motor stator winding apparatus as described in claim 6, further comprising a wire breakage stop means adapted to detect, in cooperation with said tension control means, possible wire breakage and automatically cut off the power supply to said winding apparatus.

* * * * *